(12) United States Patent
Sugihara

(10) Patent No.: US 10,570,232 B2
(45) Date of Patent: Feb. 25, 2020

(54) ALKENYL ETHER-VINYL ESTER COPOLYMER

(71) Applicant: Maruzen Petrochemical Co., Ltd., Chuo-ku (JP)

(72) Inventor: Shinji Sugihara, Fukui (JP)

(73) Assignee: Maruzen Petrochemical Co., Ltd., Chuo-ku (JP)

( * ) Notice: Subject to any disclaimer, the term of this patent is extended or adjusted under 35 U.S.C. 154(b) by 120 days.

(21) Appl. No.: 15/570,807

(22) PCT Filed: May 2, 2016

(86) PCT No.: PCT/JP2016/063528
§ 371 (c)(1),
(2) Date: Oct. 31, 2017

(87) PCT Pub. No.: WO2016/181873
PCT Pub. Date: Nov. 17, 2016

(65) Prior Publication Data
US 2018/0155477 A1  Jun. 7, 2018

(30) Foreign Application Priority Data

May 8, 2015  (JP) .................. 2015-095799

(51) Int. Cl.
*C08F 218/08* (2006.01)
*C08F 216/14* (2006.01)

(52) U.S. Cl.
CPC ...... *C08F 216/1416* (2013.01); *C08F 218/08* (2013.01); *C08F 2216/1433* (2013.01); *C08F 2800/10* (2013.01)

(58) Field of Classification Search
CPC .................. C08F 218/04; C08F 218/08; C08F 216/1416; C08F 216/1425; C08F 216/1433; C08F 216/1441; C08F 216/145
See application file for complete search history.

(56) References Cited

U.S. PATENT DOCUMENTS

| | | | | |
|---|---|---|---|---|
| 3,025,268 A * | 3/1962 | Des Deex Oliver | ... | C08F 10/00 525/328.9 |
| 3,131,162 A * | 4/1964 | Sterling | .................. | C08F 16/12 524/563 |
| 6,573,327 B1 | 6/2003 | Shibutani | | |
| 9,777,085 B2 * | 10/2017 | Sugihara | ................. | C08F 16/26 |
| 2004/0053334 A1 | 3/2004 | Ratner et al. | | |
| 2015/0005467 A1 | 1/2015 | Sugihara et al. | | |
| 2016/0208037 A1 | 7/2016 | Yoshida | | |

FOREIGN PATENT DOCUMENTS

| | | | | |
|---|---|---|---|---|
| JP | 58-206607 A | 12/1983 | | |
| JP | 58206607 A | * 12/1983 | ................. | C08F 8/12 |
| JP | 59-155411 | 9/1984 | | |
| JP | 59155411 A | * 9/1984 | ............ | C08F 218/08 |
| JP | 60-240710 A | 11/1985 | | |
| JP | 2002-3890 A | 1/2002 | | |
| JP | 2002-253286 A | 9/2002 | | |
| JP | 2013-166829 A | 8/2013 | | |
| JP | 2013-237748 A | 11/2013 | | |
| JP | 2014-47347 A | 3/2014 | | |
| JP | 2015-131893 A | 7/2015 | | |
| SU | 897778 A1 | * 1/1982 | ............ | C08F 218/08 |
| WO | WO 2004/011669 A2 | 2/2004 | | |
| WO | 2013/121910 A1 | 8/2013 | | |
| WO | 2013/122106 A1 | 8/2013 | | |

(Continued)

OTHER PUBLICATIONS

JP 58-206607 (Dec. 1, 1983); machine translation (Year: 1983).*
Su 897778 (Jan. 15, 1982); machine translation (Year: 1982).*
WO 2013/122106 (Aug. 22, 2013); machine translation (Year: 2013).*
Office Action dated Mar. 7, 2018 in Korean Patent Application No. 10-2017-7033863 with English translation, 10 pages.
International Search Report dated Jul. 12, 2016, in PCT/JP2016/063528, filed May 2, 2016.
Sugihara S. et al., "Shigeki Outousei Kobunshi" (Stimulation Responsive Polymers), Kagaku to Kogyo (Science and Industry), vol. 75, 2001, pp. 510-517.
Extended European Search Report dated Dec. 3, 2018 in Patent Application No. 16792598.1.

(Continued)

*Primary Examiner* — Rip A Lee
(74) *Attorney, Agent, or Firm* — Oblon, McClelland, Maier & Neustadt, L.L.P.

(57) ABSTRACT

An alkenyl ether-vinyl ester copolymer contains a repeating unit derived from a hydroxyl group-containing alkenyl ether represented by the following formula (1), and a repeating unit derived from a vinyl ester represented by the following formula (2):

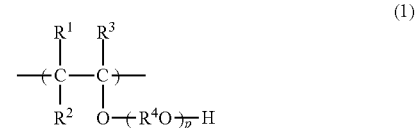

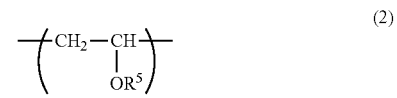

where $R^1$, $R^2$, and $R^3$ each independently represents a hydrogen atom or an alkyl group having from 1 to 4 carbon atoms; $R^4$ represents a linear or branched alkylene group having from 2 to 4 carbon atoms; $R^5$ represents an acyl group having from 1 to 20 carbon atoms; and p represents an integer of from 1 to 3. The alkenyl ether-vinyl ester copolymer exhibits temperature responsiveness showing a change in hydrophilicity and hydrophobicity at a prescribed temperature as a critical point and has a lower critical solution temperature to water of from 1° C. to 99° C.

7 Claims, 1 Drawing Sheet

(56) References Cited

FOREIGN PATENT DOCUMENTS

| WO | WO-2013122106 A1 | * | 8/2013 | ............ C08F 216/06 |
| WO | WO 2015/033899 A1 | | 3/2015 | |

OTHER PUBLICATIONS

Yun So Choi, et al., "Intelligent temperature-control composite fiber and its manufacture method", Chemical Abstracts Service, XP002785870, 2010, 3 pages.

P.G. Bagdasaryan, et al., "Copolymer dispersions", Chemical Abstracts Service, XP002785871, 1982, 3 pages.

D.E. Markosyan, et al., "Copolymer base for chewing gum", Chemical Abstracts Service, XP002785872, 1981, 2 pages.

R.U. Beisenova, et al., "Radical copolymerization of a monovinyl ether of ethylene glycol with vinyl acetate", Chemical Abstracts Service, XP002785873, 1976, 1 page.

V.E. Shulyak, et al., "Study of the effect of new polymeric flocculants on filtration of coal slurries", Chemical Abstracts Service, XP002785874, 1978, 2 pages.

Japanese Office Action dated May 14, 2019 in Patent Application No. 2015-095799 (with English translation), 10 pages.

* cited by examiner

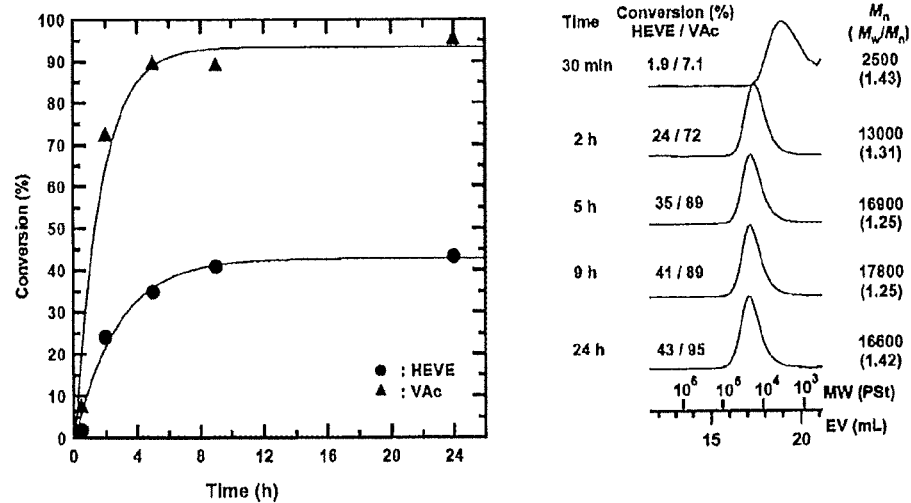
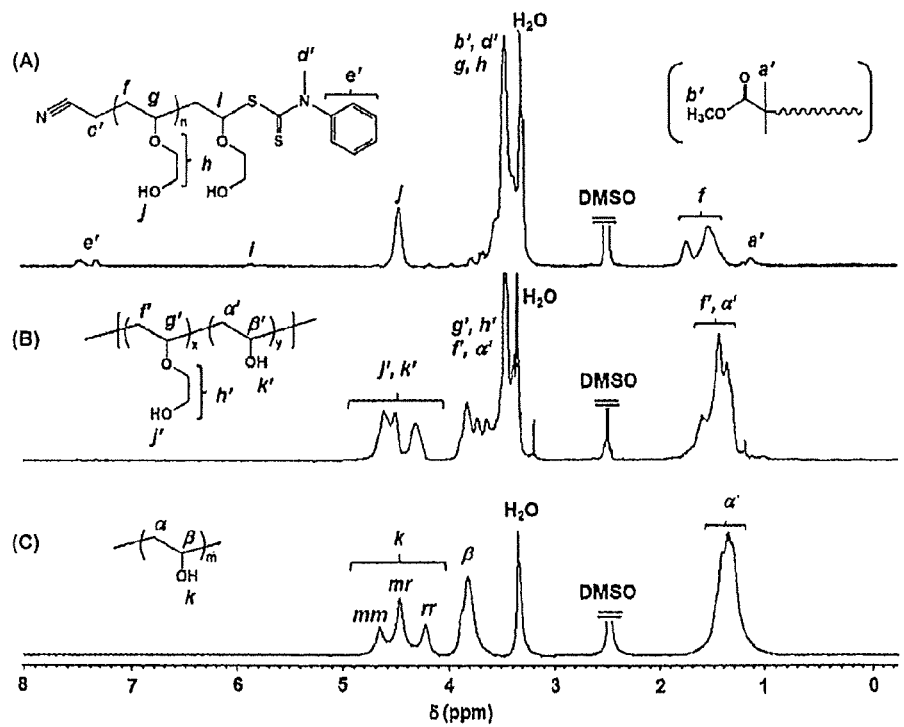
(A) poly(HEVE), (B) HEVE-r-VA copolymer, (C) PVA

ALKENYL ETHER-VINYL ESTER COPOLYMER

TECHNICAL FIELD

The present invention relates to an alkenyl ether-vinyl ester copolymer, and more specifically relates to an alkenyl ether-vinyl eater copolymer that contains a hydroxyl group on the side chain thereof and exhibits temperature responsiveness in a temperature range of from 1° C. to 99° C.

BACKGROUND ART

The studies on temperature responsive polymers showing a reversible change of from hydrophilicity on a low temperature side to hydrophobicity on a high temperature side on temperature stimulation are receiving attention. The polymers are expected to be applied to a drug carrier, a wound dressing material, an artificial muscle, a microcapsule, a biomachine, a biosensor, a separation membrane, and the like, by utilizing the property thereof, i.e., inclusion of a large amount of water.

As the temperature responsive polymer, a polymer of 2-methoxyethyl vinyl ether (MOVE) has been known. A vinyl ether copolymer containing an oxyethylene unit, such as MOVE, is excellent in biocompatibility and is expected to be applied to a medical material (PTL 1). However, a homopolymer of MOVE has a temperature, at which the phase transition occurs, i.e., a lower critical solution temperature (LCST) of approximately 65° C., and thus it is difficult to apply the homopolymer to a medical material that utilizes temperature responsiveness around body temperature.

As another polyvinyl ether containing an oxyethylene unit, a polymer of 2-hydroxyethyl vinyl ether (HEVE) has been known. The polymer of HEVE has higher hydrophilicity due to the presence of a hydroxyl group on the side chain thereof and the small number of carbon atoms of the side chain, and is expected to have utility as a medical material excellent in biocompatibility. Furthermore, diethylene glycol monovinyl ether (DEGV) with an extended oxyethylene unit while retaining the hydrophilicity also has hydrophilicity that is equivalent to or higher than that of HEVE, and is expected to be excellent in biocompatibility. However, these homopolymers are water soluble and do not show temperature responsiveness, and thus it is difficult to apply the homopolymers to a medical material that utilizes temperature responsiveness around body temperature.

It has been known that a copolymer exhibiting temperature responsiveness can be obtained through random copolymerization of HEVE with 2-hydroxybutyl vinyl ether (HBVE) having a larger number of carbon atoms than HEVE (PTL 2). However, a homopolymer of HBVE has a LCST of approximately 44° C., and the LCST is further increased by the copolymerization with HEVE having higher hydrophilicity. Therefore, it is difficult to apply the polymer to a medical material that utilizes temperature responsiveness around body temperature.

It is also known that a temperature responsive polymer is obtained through random copolymerization of HEVE with a hydrophobic vinyl ether that does not exhibit temperature responsiveness. For example, it has been known that a random copolymer of HEVE and hydrophobic isobutyl vinyl ether (IBVE) and a random copolymer of HEVE and 6-hydroxyhexyl vinyl ether exhibit sharp temperature responsiveness (NPL 1). However, an isobutyl group containing no polar group and a 6-hydroxyhexyl group having a large number of carbon atoms have high hydrophobicity, and it is expected that copolymers obtained by using these comonomers are inferior in biocompatibility.

Furthermore, the copolymers are synthesized through living cationic polymerization using a monomer having a hydroxyl group protected by a silyl group, and the synthesis method requires a protection step for the hydroxyl group and a deprotection step after the polymerization, and thus includes a large number of process steps. Moreover, since the living cationic polymerization is generally performed at a low temperature of 0° C. or less, the temperature control cannot be easily performed in an industrial scale due to the reaction heat, and if is difficult to produce the copolymers industrially efficiently at low cost.

A hydroxyl group-containing vinyl ether, such as HEVE, DEGV, and HBVE, is radically polymerizable, and a copolymer with an alkyl vinyl ether, such as IBVE, can be produced (PTL 2). However, since the hydroxyl group-containing vinyl ether and the alkyl vinyl ether, such as IBVE, have large differences in radical polymerizability and in hydrophilicity and hydrophobicity between them, the polymerization control (e.g., control of the polymer formation and the compositional ratio) is difficult and which makes it difficult to achieve a uniform distribution of the hydrophilic portion and the hydrophobic portion, and thus the copolymer obtained through radical polymerization cannot exhibit sharp temperature responsiveness.

Accordingly, such a comonomer is demanded that can lower the LCST without impairing the biocompatibility of the hydroxyl, group-containing vinyl ether and can be easily polymerized, but a suitable comonomer has not yet been found for copolymers of vinyl ethers.

Although a hydroxyl group-containing vinyl ether is radically polymerizable, the reactivity thereof is largely different from that of a general radically polymerizable vinyl monomer, such as a styrene derivative and a (meth)acrylic acid derivative, resulting in difficulty in polymerization control in copolymerization with a hydrophobic radically polymerizable vinyl monomer other than a vinyl ether, and the temperature responsiveness of the copolymer has not been investigated.

CITATION LIST

Patent Literatures

PTL 1: JP-A-2014-047347
PTL 2: JP-A-2013-166829

Non-Patent Literatures

NPL 1: "Shigeki Outousei Kobunshi" (Stimulation Responsive Polymers), Shinji SUGIHARA and Sadahito AOSHIMA, KAGAKU TO KOGYO (Science and Industry), vol. 75, pp. 510-517, 2001

SUMMARY OF INVENTION

Technical Problem

The invention has been made under the current circumstances described above, an object of the invention is to provide a temperature responsive polymer that has an arbitrary LCST in a wide temperature range of from a low temperature range of body temperature or room temperature to a high temperature range of 80° C. or more, and to provide a method capable of providing the polymer easily.

Solution to Problem

For achieving the object, the present inventors have accumulated earnest investigations focusing the radical polymerizability of a hydroxyl group-containing vinyl ether, and as a result, it has been found that a more uniform random copolymer can be obtained through radical polymerization of a hydroxyl group-containing vinyl ether and a particular radically polymerizable vinyl monomer, and temperature responsiveness can be exhibited in a wide temperature range by controlling the copolymerization composition thereof, and thus the invention has been completed.

The invention provides an alkenyl ether-vinyl ester copolymer containing a repeating unit derived from a hydroxyl group-containing alkenyl ether represented by the following general formula (1):

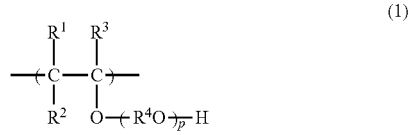

wherein $R^1$, $R^2$ and $R^3$ each independently represent a hydrogen atom or an alkyl group having a number of carbon atoms of from 1 to 4; $R^4$ represents a linear or branched alkylene group having a number of carbon atoms of from 2 to 4; and p represents an integer of from 1 to 3, and a repeating unit derived from a vinyl ester represented by the following formula (2):

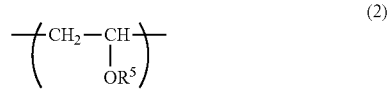

wherein $R^5$ represents an acyl group having a number of carbon atoms of from 1 to 20, and exhibiting temperature responsiveness showing a change in hydrophilicity and hydrophobicity at a prescribed temperature as a critical point.

The invention also provides the alkenyl ether-vinyl ester copolymer that has a lower critical solution temperature to water of from 1° C. to 99° C.

Advantageous Effects of Invention

The alkenyl ether-vinyl ester copolymer of the invention contains a hydroxyl group on the side chain thereof and can exhibit temperature responsiveness in a wide temperature range of from 1° C. to 99° C., and furthermore can be easily synthesized through radical polymerization.

The copolymer of the invention is excellent in biocompatibility, which is apparent from the chemical structure thereof, and can be favorably utilized in various purposes including a drug carrier, a wound dressing material, an artificial muscle, a microcapsule, a biomachine, a biosensor, a separation membrane, and the like.

BRIEF DESCRIPTION OF DRAWINGS

FIG. 1 is diagrams showing the change of monomer conversion, and the number average molecular weight Mn and the molecular weight distribution Mw/Mn of the polymer, with respect to the polymerization time of the copolymer obtained in Example 2.

FIG. 2 is diagrams showing the $^1$H-NMR analysis results of the copolymer obtained in Reference Example 1.

DESCRIPTION OF EMBODIMENTS

Preferred embodiments of the invention will be described below.

The copolymer of the invention contains a repeating unit derived from a hydroxyl group-containing alkenyl ether represented by the general formula (1) and a repeating unit derived from a vinyl ester represented by the general formula (2).

In the formula (1), $R^1$, $R^2$, and $R^3$ preferably represent a hydrogen atom, and may be an alkyl group in such an amount that does not impair the effects of the invention. The alkyl group is preferably an alkyl group having a number of carbon atoms of from 1 to 4, and specific examples thereof include a methyl group, an ethyl group, a n-propyl group, an isopropyl group, a n-butyl group, an isobutyl group, and a tert-butyl group.

In the formula (1), the linear or branched alkylene group represented by $R^4$ is preferably a linear or branched alkylene group having a number of carbon, atoms of from 2 to 4, and specific examples thereof include an ethylene group, a 1,2- or 1,3-propylene group, and 1,2-, 1,3-, or 1,4-butylene group. Among these, an ethylene group is preferred since the affinity to water, the biocompatibility, and the effects of the invention become excellent. The number of repetition p of the oxyalkylene group is preferably 1 or 2, and particularly preferably 1.

In the formula (2), the acyl group having a number of carbon atoms of from 1 to 20 represented by $R^5$ may be an aliphatic acyl group or an acyl group containing an aromatic group. Specific examples of the aliphatic acyl group include a formyl group, an acetyl group, a propionyl group, a butyryl group, an isobutyryl group, a valeroyl group, an isovaleroyl group, a pivaloyl group, a hexanoyl group), a heptanoyl group, an octanoyl group, a decanoyl group, a dodecanoyl group, a stearoyl group, and a cyclohexanecarbonyl group. Examples of the acyl group containing an aromatic group include a benzoyl group, a naphthoyl group, and a toluoyl group. Among these, an aliphatic acyl group having a number of carbon atoms of from 2 to 4, such as an acetyl group, a propionyl group, a butyryl group, and an isobutyryl group, is more preferred, and an acetyl group is particularly preferred, since the effects of the invention become excellent.

The copolymer of the invention can be obtained by performing radical polymerization of a hydroxyl group-containing alkenyl ether represented by the following general formula (3):

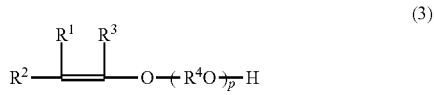

wherein $R^1$, $R^2$, $R^3$, $R^4$, and p have the same meanings as in the formula (1), and a vinyl ester (5) described later as monomers.

The alkenyl ether represented by the formula (3) is preferably a vinyl ether compound represented by the general formula (4):

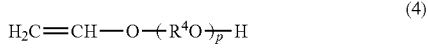

wherein $R^4$ and p have the same meanings as in the formula (1), and specific examples thereof include 2-hydroxyethyl vinyl ether, 3-hydroxypropyl vinyl ether, propylene glycol monovinyl ether, 4-hydroxybutyl vinyl ether, diethylene glycol monovinyl ether, and triethylene glycol monovinyl ether. These vinyl ether compounds may be used solely as a single kind thereof or may be used in combination of two or more kinds thereof. Among these, a vinyl ether containing an oxyethylene unit, such, as 2-hydroxyethyl vinyl ether, diethylene glycol monovinyl ether, and triethylene glycol monovinyl ether, is preferred, and 2-hydroxyethyl vinyl ether and diethylene glycol monovinyl ether are particularly preferred, since the effects of the invention become excellent.

Examples of the vinyl ester monomer copolymerized with the alkenyl ether (2) include compounds represented by the following general formula (5):

wherein $R^5$ has the same meaning as in the formula (2), and specific examples thereof include an aliphatic vinyl ester, such as vinyl formate, vinyl acetate, vinyl propionate, vinyl butyrate, vinyl isobutyrate, vinyl valerate, vinyl isovalerate, vinyl pivalate, vinyl caprate, vinyl laurate, vinyl stearate, and vinyl versatate; and an aromatic vinyl ester, such as vinyl benzoate. Among these, an aliphatic vinyl ester having a number of carbon atoms of from 4 to 6, such as vinyl acetate, vinyl propionate, vinyl butyrate, and vinyl isobutyrate, is more preferred, and vinyl acetate is particularly preferred, since the effects of the invention become excellent.

The structure of the alkenyl ether-vinyl ester copolymer of the invention (which may be hereinafter referred to as the "polymer of the invention") is preferably a random copolymer structure. The uniform distribution of the alkenyl ether units containing a hydroxyl group in the polymer chain enables exhibition of the sharp temperature responsiveness.

The radical polymerization method used for providing the polymer of the invention may be a method that has been ordinarily employed in radical polymerization of a vinyl ester. Specifically, a general radical polymerization method and a living radical polymerization method, such as RAFT polymerization, may be employed.

Examples of the general radical polymerization method include a method of performing polymerization reaction of the hydroxyl group-containing alkenyl ether and the vinyl ester with a radical polymerization initiator in the presence or absence of polymerization solvent.

The polymerization solvent is not particularly limited as far as the solvent is inert to the polymerization reaction, and may be appropriately determined depending on the kind and the amount of the monomer, the polymerization conditions, such as the polymerization temperature and the polymerization concentration, and the like.

Examples or the polymerization solvent include a monohydric alcohol, such as methanol, ethanol, isopropanol, n-butanol, and s-butanol; a glycol, such as ethylene glycol and propylene glycol; a cyclic ether, such as tetrahydrofuran and dioxane; a glycol monoether, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, and 3-methoxybutanol; a glycol ether, such as ethylene glycol dimethyl ether, ethylene glycol diethyl ether, ethylene glycol ethyl methyl ether, diethylene glycol dimethyl ether, diethylene glycol diethyl ether, diethylene glycol ethyl methyl ether, propylene glycol dimethyl ether, and propylene glycol diethyl ether; an ester of a glycol monoether, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and 3-methoxybutyl acetate; an alkyl ester, such as methyl acetate, ethyl acetate, propyl acetate, isopropyl acetate, butyl acetate, methyl propionate, ethyl propionate, butyl propionate, methyl lactate, ethyl lactate, butyl lactate, methyl 3-methoxypropionate, ethyl 3-methoxypropionate, methyl 3-ethoxypropionate, ethyl 3-ethoxypropionate, methyl acetoacetate, and ethyl acetoacetate, a ketone, such as acetone, methyl ethyl ketone, methyl isobutyl ketone, and cyclohexanone; an aromatic hydrocarbon, such as benzene, toluene, xylene, and ethylbenzene; an aliphatic hydrocarbon, such as hexane, cyclohexane, and octane; an amide, such as dimethylformamide, dimethylacetamide, and N-methylpyrrolidone; and water. These compounds may be used solely or as a combination of two or more kinds thereof.

The amount of the solvent used is preferably from 40 to 1,000% by mass, and more preferably from 100 to 400% by mass, based on the total amount of the monomer component as 100% by mass.

The radical polymerization initiator is not particularly limited as far as the initiator forms a radical with heat, and can be appropriately selected from the general radical polymerization initiators (which may be hereinafter abbreviated as "polymerization initiators"), such as a peroxide and an azo compound, depending on the polymerization temperature, the kinds of the solvent and the monomer, and the like.

Examples of the peroxide include t-butyl hydroperoxide, cumene hydroperoxide, t-butyl peroxyacetate, t-butyl peroxybenzoate, t-butyl peroxyoctanoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, and ammonium persulfate.

Examples of the azo compound include an oil soluble azo compound, such as 2,2'-azobis(isobutyronitrile), 2,2'-azobis(4-methoxy-2,4-dimethylvaleronitrile), 2,2'-azobis(2,4-dimethylvaleronitrile), dimethyl 2,2'-azobis(2-methylpropionate), 2,2'-azobis(2-methylbutyronitrile), 1,1'-azobis(cyclohexanecarbonitrile), 2,2'-azobis[N-(2-propenyl)-2-methylpropionamide], and 2,2'-azobis(N-butyl-2-methylpropionamide), and a water soluble azo compound, such as 2,2'-azobis[2-(2-imidazolin-2-yl)propane]dihydrochloride, 2,2'-azobis[2-(2-imidazolin-2-yl)propane]disulfate dihydrate, 2,2'-azobis(2-methylpropionamide) dihydrate, 2,2'-azobis[N-(2-carboxyethyl)-2-methylpropionamide]tetrahydrate, 2,2'-azobis[2-(2-imidazolin-2-yl)propane], 2,2'-azobis[2-methyl-N-(2-hydroxyethyl)propionamide], and 2,2'-azobis[1-imino-1-pyrrolidino-2-methylpropane]dihydrochloride. These polymerization initiators may be used solely or as a combination of two or more kinds thereof.

Among the polymerization initiators, an azo compound is preferred, a non-nitrile azo compound is more preferred, and dimethyl 2,2'-azobis(2-methylpropionate) is particularly preferred, from the standpoint of the reactivity and the easiness of handling.

The amount of the polymerization initiator used is not particularly limited and may be appropriately determined depending on the kind and the amount of the monomer used, the polymerization conditions, such as the polymerization temperature and the polymerization concentration, the molecular weight of the target polymer, and the like, and for providing a polymer having a weight average molecular weight of from several thousands to several tens of thousands, the amount thereof is preferably in a range of from 0.05 to 20% by mass, and more preferably in a range of from 0.1 to 10% by mass, based on the total amount of the monomer component as 100% by mass.

Examples of the RAFT polymerization method include a method of performing polymerization reaction of the hydroxyl group-containing alkenyl ether and the vinyl ester with a polymerization initiator and a reversible addition fragmentation chain transfer agent (RAFT agent) in the presence or absence of a polymerization solvent.

Examples of the polymerization solvent and the polymerization initiator herein include the same ones as described for the general radical polymerization method.

The RAFT agent used may be generally a thiocarbonylthio compound, such as a dithiocarbamate ester, a xanthogenate ester, a dithiocarboxylate ester, and a trithiocarbonate. Among these, a dithiocarbamate ester and a xanthogenate ester are preferred, and a dithiocarbamate ester is particularly preferred, from the standpoint of the reactivity and the easiness of polymerization control.

Examples of the dithiocarbamate ester include S-cyanomethyl-N-methyl-N-phenylcarbamodithioate, S-cyanomethyl-N,N-diphenylcarbamodithioate, 1-succinimidyl-4-cyano-4-[N-methyl-N-(4-pyridyl)carbamothioylthio]pentanoate, S-2-cyanopropan-2-yl-N-methyl-N-(4-pyridyl)carbamodithioate, S-cyanomethyl-N-methyl-N-(pyridin-4-yl)carbamodithioate, methyl 2-[N-methyl-N(pyridin-4-yl)carbamothioylthio]propanoate, and benzyl 1H-pyrrole-1-carbodithioate.

Examples of the xanthogenate ester include a benzyl ester, such as O-ethyl-S-benzyl xanthate; and a cyano alkyl ester, such as O-ethyl-3-cyanomethyl xanthate and O-ethyl-S-(2-cyanopropan-2-yl) xanthate. These RAFT agents may be used solely or in combination of two or more kinds thereof.

Among these RAFT agents, S-cyanomethyl-N,N-diphenylcarbamodithioate, S-cyanomethyl-N-methyl-N-phenylcarbamodithioate, and benzyl 1H-pyrrole-1-carbodithioate are preferred, and S-cyanomethyl-N-methyl-N-phenylcarbamodithioate is particularly preferred, from the standpoint of the reactivity and the easiness of polymerization control.

In the case where the polymer of the invention is produced by the RAFT method, the amount of the RAFT agent used is not particularly limited and may be appropriately determined depending on the kind and the amount of the monomer used, the polymerization conditions, such as the polymerization temperature and the polymerization concentration, the molecular weight of the target polymer, and the like, and for providing a polymer having a number average molecular weight of from several thousands to several tens of thousands, the amount thereof 3.3 preferably from 0.1 to 20% by mass, and more preferably in a range of from 0.5 to 10% by mass, based on the total amount of the monomer component as 100% by mass.

In the copolymer of the invention, the ester group derived from the vinyl ester may be converted to a hydroxyl group through partial saponification after the radical polymerization in such an extent that does not impair the effects of the invention.

The partial saponification may be performed with an alkali catalyst or an acid catalyst after dissolving the copolymer in an alcohol or an aqueous alcohol. Examples of the alcohol include methanol, ethanol, propanol, and tert-butanol, and methanol is particularly preferably used. The concentration of the copolymer in the alcohol is generally in a range of from 10 to 60% by mass.

Examples of the alkali catalyst used for the saponification include a hydroxide and an alcoholate of an alkali metal, such as sodium hydroxide, potassium hydroxide, sodium methylate, sodium ethylate, potassium methylate, and lithium methylate. Examples of the acid catalyst include sulfuric acid, hydrochloric acid, nitric acid, methanesulfonic acid, and a cation exchange resin.

The amount of the catalyst used in the saponification may be appropriately determined depending on the kind of the catalyst, the target saponification degree, and the like, and in the case where the alkali catalyst is used, is generally from 0.1 to 30 mole %, and preferably from 2 to 15 mole %, based on the repeating unit derived from the vinyl ester. The reaction temperature in the saponification is not particularly limited, and is generally from 10 to 80° C., and preferably from 20 to 50° C.

The saponification degree may be appropriately determined within such a range that does not impair the temperature responsiveness of the copolymer, depending on the kind and the ratio of the alkenyl ether, and the like, and the repeating unit derived from the vinyl ester is preferably left in an amount of at least 5 mole %, and more preferably left in an amount of at least 10 mole %, based on the total amount of the repeating units. The copolymer having a high saponification degree with the amount of the repeating unit derived from the vinyl ester left of less than 5 mole % and the completely saponified copolymer do not exhibit temperature responsiveness in most cases, and can be utilized, for example, as a polyvinyl alcohol that is easily soluble in cold water.

The copolymer of the invention thus produced above can exhibit the target temperature responsiveness by appropriately selecting and adjusting the ratio of the alkenyl ether (3) and the vinyl ester (5) depending on the kind of the alkenyl ether (3) copolymerized.

For example, in the case where 2-hydroxyethyl vinyl ether (HEVE) is used as the alkenyl ether (3), the ratio of the vinyl ester (5) is preferably in a range of from 10 to 65 mole %, more preferably in a range of from 20 to 55 mole %, and further preferably from 30 to 50 mole %, based on the total amount of the monomer. In the case where 4-hydroxybutyl vinyl ether (HBVE) or the like, which has higher hydrophobicity than HEVE, is used, the ratio of the vinyl ester (5) is preferably in a range of from 5 to 15 mole % based on the total amount of the monomer, and in the case where diethylene glycol vinyl ether (DEGV) or the like, which has higher hydrophilicity, is used, the ratio of the vinyl ester (5) is preferably in a range of from 30 to 70 mole % based on the total amount of the monomer.

The copolymer having an arbitrary composition within the range can have an arbitrary LCST preferably in a range of from 1° C. to 99° C., more preferably in a range of from 5° C. to 90° C., and further preferably in a range of from 10° C. to 80° C. Furthermore, the copolymer can have an LCST in a range of from 20° C. to 40° C., and thus can be applied to a medical material that utilizes temperature responsiveness expressed around body temperature.

The copolymer of the invention may contain another monomer unit capable of being copolymerized therewith in such a range that does not impair the effects of the invention. The kind and the amount thereof may be appropriately selected and adjusted depending on the target, purpose, and the like.

Examples of the copolymerizable additional monomer include an unsaturated carboxylic acid and a derivative thereof, an unsaturated ketone, an unsaturated hydrocarbon compound, a cyano group-containing unsaturated hydrocarbon compound, an unsaturated alcohol compound other than the alkenyl ether compound represented by the formula (3), an aromatic vinyl compound, and an N-vinylamine compound shown below.

(1) Unsaturated Carboxylic Acid and Derivative Thereof

Examples of the unsaturated carboxylic acid include (meth)acrylic acid, crotonic acid, cinnamic acid, maleic acid, fumaric acid, itaconic acid, trans-2-hexanoic acid. In the description herein, (meth)acrylic acid means acrylic acid or methacrylic acid.

(2) Derivative of Unsaturated Carboxylic Acid

Examples of the derivative of an unsaturated carboxylic acid include an unsaturated carboxylate salt, an unsaturated carboxylic anhydride, an unsaturated carboxylic acid chloride, an unsaturated carboxylate ester, an unsaturated carboxylic acid amide, and a maleimide compound. Among these, examples of the unsaturated carboxylate salt include sodium salts and potassium salts of the aforementioned unsaturated carboxylic acids. Examples of the unsaturated carboxylic anhydride include anhydrides of the aforementioned unsaturated carboxylic acids. Examples of the unsaturated carboxylic acid chloride include carboxylic acid chlorides of the aforementioned unsaturated carboxylic acids. Examples of the unsaturated carboxylate ester include methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, decyl (meth)acrylate, dodecyl (meth)acrylate, cyclohexyl (meth)acrylate, tetrahydrofurfuryl (meth)acrylate, allyl (meth)acrylate, vinyl (meth)acrylate, phenyl (meth)acrylate, benzyl (meth)acrylate, glycidyl (meth)acrylate, 2-(dimethylamino)ethyl (meth)acrylate, 2-ethoxyethyl (meth)acrylate, and 2-hydroxyethyl (meth)acrylate. Examples of the unsaturated carboxylic acid amide include (meth)acrylamide, N-methyl(meth; acrylamide, N-(t-butyl) (meth)acrylamide, N,N-dimethyl (meth)acrylamide, N-methylol(meth)acrylamide, N-(3-dimethylaminopropyl) (meth)acrylamide, and crotonamide. Examples of the maleimide compound include maleimide, N-methylmaleimide, N-ethylmaleimide, and N-phenylmaleimide.

(3) Unsaturated Ketone

Examples of the unsaturated ketone include isopropylideneacetone, diisopropylideneacetone, 2-cyclohexen-1-one, 2-cyclopenten-1-one, 3-decen-2-one, 3-methyl-3-buten-2-one, methyl vinyl ketone, 3-nonen-2-one, and 3-octen-2-one.

(4) Unsaturated Hydrocarbon Compound

Examples of the unsaturated hydrocarbon compound include an alkene, such as ethylene, propene, 1-butene, 2-butene, isobutene, 1-pentene, 1-hexene, and 1-octene, and a conjugated diene, such as 1,3-butadiene, isoprene, 1,3-pentadiene, 1,3-hexadiene, 1,3-cyclohexadiene, 1,3-cycloheptadiene, 1,3-cyclooctadiene, 2,5-dimethyl-2,4-hexadiene, and chloroprene.

(5) Cyano Group-Containing Unsaturated Hydrocarbon Compound

Examples of the cyano group-containing unsaturated hydrocarbon compound include acrylonitrile, methacrylonitrile, α-chloroacrylonitrile, and α-cyanoethylacrylonitrile.

(6) Unsaturated Alcohol

Examples of the unsaturated alcohol include allyl alcohol and cinnamyl alcohol.

(7) Aromatic Vinyl Compound

Examples of the aromatic vinyl compound include styrene, 2-methylstyrene, 3-methyl styrene, 4-methylstyrene, 2,4,6-trimethylstyrene, 4-butylstyrene, 4-phenylstyrene, 4-fluorostyrene, 2,3,4,5,6-pentafluorostyrene, 4-chlorostyrene, 4-bromostyrene, 4-iodostyrene, 4-hydroxystyrene, 4-aminostyrene, 4-carboxystyrene, 4-acetoxystyrene, 4-cyanomethylstyrene, 4-chloromethylstyrene, 4-methoxystyrene, 4-nitrostyrene, sodium 4-styrenesulfonate, 4-styrenesulfonic acid chloride, 4-vinylphenylboronic acid, α-methylstyrene, trans-β-methylstyrene, 2-methyl-1-phenylpropene, 1-phenyl-1-cyclohexene, β-bromostyrene, sodium β-styrenesulfonate, 2-vinylpyridine, 4-vinylpyridine, 2-isopropenylnaphthalene, and 1-vinylimidazole.

(8) N-Vinylamine Compound

Examples of the N-vinylamine compound include N-vinylpyrrolidone, N-vinylcaprolactam, and N-vinylcarbazole.

The molecular weight of the copolymer of the invention thus obtained above may be appropriately determined depending on the target and the purpose, and in terms of number average molecular weight Mn, is preferably 1,000 or more, more preferably 3,000 or more, and further preferably 5,000 or more, and is preferably 300,000 or less, more preferably 200,000 or less, and further preferably 100,000 or less. The molecular weight distribution (Mw/Mn) of the copolymer is generally 2.8 or less, preferably 2.5 or less, more preferably 1.8 or less, and particularly preferably 1.6 or less. The narrower distribution can reduce the temperature change on temperature ascending and descending.

EXAMPLES

The invention will be described in more detail with reference to examples and a reference example below, but the invention is not limited, to the examples and the like. The measurements in the examples were performed according to the following measurement methods.

(1) The analysis of the number average molecular weight (Mn) and the molecular weight distribution (Mw/Mn) of the polymer was performed by gel permeation chromatography (GPC).

Analysis Condition

Column: TSKgel Column G-MHHR-M×2 (produced by Tosoh Corporation, or Shodex GPC KD804×3 (produced by Showa Denko K.K.)

Solvent: dimethylformamide (containing 10 mmol/L of lithium bromide)

Measurement temperature: 40° C.

Flow rate: 1.0 mL/min (2) The calculation of the monomer conversion and the structural analysis of the polymer were performed by $^1$H-NMR (JNM AL-300 or JNM ECX-500II, produced by JEOL, Ltd.) (solvent: deuterated water, deuterated chloroform, or deuterated dimethylsulfoxide (DMSO)).

Example 1

Synthesis Example of (HEVE-r-VAc) Random Copolymer (1)

Radical Bulk Polymerization 2.223 g (25.5 mmol) of 2-hydroxyethyl vinyl ether (hereinafter referred to as "HEVE"), 1.777 g (20.64 mmol) of vinyl acetate (hereinafter referred to as "VAc"), and 0.021 g (0.032 mmol) of dimethyl 2,2'-azobis(2-methylpropionate; (V-601, a trade name, produced by Wako Pure Chemical Industries, Ltd., hereinafter referred to as "V-601") as a radical polymerization initiator were added to a test tube and sufficiently dissolved (HEVE/VAc=55/45, monomer/V-601=500/1). Subsequently, a stirring bar was added to the test tube, and nitrogen was blown into the test tube in an ice bath for deoxygenation. After the deoxygenation, the test tube was sealed, and radical bulk, polymerization was performed in an oil bath at 70° C. Radical bulk polymerization was also performed in the same manner as above except that HEVE/VAc was changed to 59/41, 60/40, 62/36, 65/35, 67/33, and 70/30.

For the resulting copolymer, the monomer conversion, and the number average molecular weight Mn and the molecular weight distribution Mw/Mn of the copolymer were obtained by the GPC analysis and the NMR analysis. The resulting copolymer was dissolved in water to a concentration of 1.0% by mass. The temperature of the aqueous solution was changed from 10° C. to 80° C. (temperature ascending) or changed from 80° C. to 10° C. (temperature descending), and the point where the transmittance at a wavelength of 500 nm became 50% was designated as LCST.

The results are shown in Table 1.

TABLE 1

| HEVE/ VAc (molar ratio) | Monomer conversion of HEVE/VAc (%) | Mn | Mw/Mn | LCST (° C.) Temperature ascending | LCST (° C.) Temperature descending |
|---|---|---|---|---|---|
| 55/45 | 95/100 | 45,400 | 2.50 | 18 | 16 |
| 59/41 | 97/99 | 44,000 | 2.50 | 37 | 35 |
| 60/40 | 97/100 | 66,300 | 1.53 | 38 | 38 |
| 62/38 | 98/99 | 36,400 | 2.50 | 40 | 39 |
| 65/35 | 99/99 | 36,400 | 2.80 | 45 | 40 |
| 67/33 | 99/100 | 48,000 | 2.45 | 54 | 52 |
| 70/30 | 99/99 | 48,000 | 2.45 | 58 | 56 |

Example 2

Synthesis Example of (HEVE-r-VAc) Random Copolymer (2)

RAFT Polymerization 2.56 g (29 mmol) of HEVE, 2.5 g (2.9 mmol) of VAc, 0.027 g (0.11 mmol) of V-601 as a radical polymerization initiator, and 0.0645 g (0.29 mmol) of S-cyanomethyl-N-methyl-M-phenylcarbamodithioate (produced by Sigma-Aldrich Corporation) as a RAFT agent were added to a test tube and sufficiently dissolved (HEVE/VAc=100/100, CMPCD/V-601=5/2). Subsequently, a stirring bar was added to the test tube, and nitrogen was blown into the test tube in an ice bath for deoxygenation. After the deoxygenation, the test tube was sealed, and RAFT polymerization was performed in an oil bath at 70° C.

After elapsing an arbitrary polymerization time, a part of the reaction solution was drawn, and the monomer conversion, and the number average molecular weight Mn and the molecular weight distribution Mw/Mn of the polymer were obtained by the GPC analysis and the NMR analysis. As a result, after elapsing 24 hours, the monomer conversion was 3% for HEVE and 35% for VAc, and the resulting polymer had a number average molecular weight Mn of 16,600 and a molecular weight distribution Mw/Mn of 1.42. The ratio HEVE/VAc was 31/69. FIG. 1 shows the change of monomer conversion, and the number average molecular weight Mn and the molecular weight distribution Mw/Mn of the polymer, with respect to the polymerization time.

Example 3

Synthesis Example of (HEVE-r-VAc) Random Copolymer (3)

RAFT Polymerization

RAFT polymerization was performed in the same manner as in Example 2 except that the charge concentration of the monomers was changed to HEVE/VAc=1/2. After elapsing 24 hours, the monomer conversion was 52% for HEVE and 92% for VAc, and the resulting polymer had a number average molecular weight Mn of 32,200 and a molecular weight distribution Mw/Mn of 1.21. The ratio HEVE/Vac was 22/78.

Example 4

Synthesis Example of (HEVE-r-VAc) Random Copolymer (4)

RAFT Polymerization

RAFT polymerization was performed in the same manner as in Example 2 except that the charge concentration of the monomers was changed to HEVE/VAc=2/1. After elapsing 24 hours, the monomer conversion was 33% for HEVE and 92% for VAc, and the resulting polymer had a number average molecular weight Mn of 17,400 and a molecular weight distribution Mw/Mn of 1.38. The ratio HEVE/VAc was 41/59.

Example 5

Synthesis Example of (DEGV-r-VAc) Random Copolymer

Radical Bulk Polymerization 2.602 g (19.69 mmol) of diethylene glycol monovinyl ether (hereinafter referred to as "DEGV"), 1.411 g (16.38 mmol) of VAc, and 16.7 mg (0.073 mmol) of V-601 as a radical polymerization initiator were, added to a test tube and sufficiently dissolved (DEGV/VAc=55/45, monomer/V-601=500/1). Subsequently, a stirring bar was added to the test tube, and nitrogen was blown into the test tube in an ice bath for deoxygenation. After the deoxygenation, the test tube was sealed, and radical bulk polymerization was performed in an oil bath at 60° C.

Radical bulk polymerization was also performed, in the same manner as above except that DEGV/VAc was changed to 33/67, 40/60, and 50/50.

For the resulting copolymer, the monomer conversion, and the number average molecular weight Mn and the molecular weight distribution Mw/Mn of the copolymer were obtained by the GPC analysis and the NMR analysis. The resulting copolymer was dissolved in water to a concentration of 1.0% by mass. The temperature of the aqueous solution was changed from 1° C. to 80° C. (temperature ascending) or changed from 80° C. to 1° C. (temperature descending), and the point where the transmittance at a wavelength of 500 nm became 50% was designated as LCST.

The results are shown in Table 2.

TABLE 2

| DEGV/ VAc (molar ratio) | Monomer conversion of DEGV/VAc (%) | Mn | Mw/Mn | LCST (° C.) Temperature ascending | LCST (° C.) Temperature descending |
|---|---|---|---|---|---|
| 33/67 | 99/100 | 18,500 | 2.60 | 12 | 6 |
| 40/60 | 99/99 | 20,200 | 2.59 | 18 | 13 |
| 50/50 | 99/100 | 20,000 | 2.50 | 31 | 29 |
| 55/45 | 99/99 | 20,800 | 2.78 | 40 | 37 |

Reference Example 1

Synthesis of (HEVE-r-Vinyl Alcohol) Random Copolymer

A (HEVE-r-vinyl alcohol) random copolymer was synthesized by saponifying the (HEVE-r-VAc) random copolymer obtained in Example 2. Specifically, 0.37 g of the copolymer obtained in Example 2 was dissolved in 18.14 g of methanol to prepare a 2% by mass polymer solution. 18.51 g of a 2% by mass KOH methanol solution was added thereto, and reaction was performed at room temperature for 24 hours under stirring. After 24 hours, a HCl methanol solution having an appropriate concentration was added thereto to neutralize the solution until reaching neutral checked with pH test paper. After removing methanol through evaporation, the resulting polymer was dissolved in water and purified through dialysis. The polymer after the purification was dissolved in deuterated DMSO and confirmed for the structure by the $^1$H-NMR analysis. FIG. 2 shows the $^1$H-NMR measurement results of the resulting copolymer.

The invention claimed is:

1. An alkenyl ether-vinyl ester copolymer, comprising
a repeating unit derived from a hydroxyl group-containing alkenyl ether represented by formula (1):

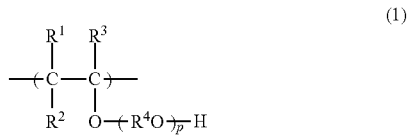

where $R^1$, $R^2$, and $R^3$ each independently represent a hydrogen atom or an alkyl group comprising a number of carbon atoms of from 1 to 4; $R^4$ represents a linear or branched alkylene group comprising a number of carbon atoms of from 2 to 4; and p represents an integer of from 1 to 3, and
a repeating unit derived from a vinyl ester represented formula (2):

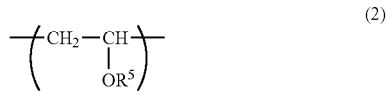

where $R^5$ represents an acyl group comprising a number of carbon atoms of from 1 to 20,
wherein
a molar ratio of vinyl ether of formula (1) to vinyl ester of formula (2) is from 33:67 to 70:30,
a number average molecular weight (Mn) of the alkenyl ether-vinyl ester copolymer is from 5,000 to 100,000,
a molecular weight distribution (Mw/Mn) of the of the alkenyl ether-vinyl ester copolymer is 2.8 or less, and
the alkenyl ether-vinyl ester copolymer exhibits temperature responsiveness showing a change in hydrophilicity and hydrophobicity at a prescribed temperature as a critical point.

2. The alkenyl ether-vinyl ester copolymer according to claim 1, wherein the alkenyl ether-vinyl ester copolymer has a lower critical solution temperature to water of from 1° C. to 99° C.

3. The alkenyl ether-vinyl ester copolymer according to claim 1, wherein the hydroxyl group-containing alkenyl ether is a vinyl ether containing an oxyethylene unit.

4. The alkenyl ether-vinyl ester copolymer according to claim 1, wherein the vinyl ester is an aliphatic vinyl ester comprising a number of carbon atoms of from 4 to 6.

5. The alkenyl ether-vinyl ester copolymer according to claim 2, wherein the hydroxyl group-containing alkenyl ether is a vinyl ether containing an oxyethylene unit.

6. The alkenyl ether-vinyl ester copolymer according to claim 2, wherein the vinyl ester is an aliphatic vinyl ester comprising a number of carbon atoms of from 4 to 6.

7. The alkenyl ether-vinyl ester copolymer according to claim 3, wherein the vinyl ester is an aliphatic vinyl ester comprising a number of carbon atoms of from 4 to 6.

* * * * *